US012578863B2

(12) United States Patent
Haukness et al.

(10) Patent No.: US 12,578,863 B2
(45) Date of Patent: Mar. 17, 2026

(54) LOW LATENCY DYNAMIC RANDOM ACCESS MEMORY (DRAM) ARCHITECTURE WITH DEDICATED READ-WRITE DATA PATHS

(71) Applicant: Rambus Inc., San Jose, CA (US)

(72) Inventors: Brent Steven Haukness, Sunnyvale, CA (US); Christopher Haywood, Fernandina Beach, FL (US); Torsten Partsch, San Jose, CA (US); Thomas Vogelsang, Mountain View, CA (US)

(73) Assignee: Rambus Inc., San Jose, CA (US)

( * ) Notice: Subject to any disclaimer, the term of this patent is extended or adjusted under 35 U.S.C. 154(b) by 107 days.

(21) Appl. No.: 18/681,716

(22) PCT Filed: Aug. 8, 2022

(86) PCT No.: PCT/US2022/039704
§ 371 (c)(1),
(2) Date: Feb. 6, 2024

(87) PCT Pub. No.: WO2023/018653
PCT Pub. Date: Feb. 16, 2023

(65) Prior Publication Data
US 2024/0345735 A1 Oct. 17, 2024

Related U.S. Application Data

(60) Provisional application No. 63/231,637, filed on Aug. 10, 2021.

(51) Int. Cl.
G06F 3/06 (2006.01)

(52) U.S. Cl.
CPC .......... G06F 3/0611 (2013.01); G06F 3/0659 (2013.01); G06F 3/0673 (2013.01)

(58) Field of Classification Search
CPC .... G06F 3/0611; G06F 3/0659; G06F 3/0673; G11C 8/12; G11C 11/4076; G11C 11/4087; G11C 11/4093
See application file for complete search history.

(56) References Cited

U.S. PATENT DOCUMENTS 5,778,419 A 7/1998 Hansen et al.
6,018,478 A 1/2000 Higuchi
(Continued)

OTHER PUBLICATIONS

Chatterjee, Niladrish et al., "Staged Reads: Mitigating the Impact of DRAM Writes on DRAM Reads", IEEE 2011, 12 pages.
(Continued)

*Primary Examiner* — Zhuo H Li
(74) *Attorney, Agent, or Firm* — Lance Kreisman; Peninsula Patent Group

(57) ABSTRACT

Memory devices, modules, controllers, systems and associated methods are disclosed. In one embodiment, a dynamic random access memory (DRAM) device is disclosed. The DRAM device includes memory core circuitry including an array of DRAM storage cells organized into bank groups. Each bank group includes multiple banks, where each of the multiple banks includes addressable columns of DRAM storage cells. The DRAM device includes signal interface circuitry having dedicated write data path circuitry and dedicated read data path circuitry. Selector circuitry, for a first memory transaction, selectively couples at least one of the addressable columns of DRAM storage cells to the dedicated read data path circuitry or the dedicated write data path circuitry.

18 Claims, 8 Drawing Sheets

(56) References Cited

U.S. PATENT DOCUMENTS

| | | | |
|---|---|---|---|
| 6,307,693 B1* | 10/2001 | Griffiths | G11B 5/02 |
| 6,343,352 B1 | 1/2002 | Davis et al. | |
| 6,466,507 B2 | 10/2002 | Ryan | |
| 7,209,405 B2 | 4/2007 | Jeddeloh | |
| 8,018,752 B2 | 9/2011 | Jeddeloh | |
| 8,397,020 B2 | 3/2013 | Kootstra | |
| 8,665,662 B2 | 3/2014 | Perego et al. | |
| 8,898,415 B2 | 11/2014 | Gillingham | |
| 2001/0002180 A1* | 5/2001 | Ryan | G06F 12/0893 |
| | | | 365/230.01 |
| 2006/0007758 A1 | 1/2006 | Lee | |
| 2009/0006775 A1* | 1/2009 | Bartley | G06F 13/1684 |
| | | | 711/E12.001 |
| 2012/0087200 A1 | 4/2012 | Lee et al. | |
| 2012/0300528 A1 | 11/2012 | Kang et al. | |
| 2013/0254475 A1* | 9/2013 | Perego | G11C 11/40603 |
| | | | 711/106 |

| | | | |
|---|---|---|---|
| 2018/0088850 A1* | 3/2018 | Willcock | G11C 7/1006 |
| 2019/0220222 A1 | 7/2019 | Ware et al. | |
| 2019/0311750 A1 | 10/2019 | Han | |
| 2020/0357445 A1* | 11/2020 | Lee | G11C 5/147 |
| 2022/0011972 A1 | 1/2022 | Madrid | |
| 2023/0215495 A1* | 7/2023 | Pazzocco | G11C 11/4087 |
| | | | 365/189.011 |

OTHER PUBLICATIONS

Notification of Transmittal of the International Search Report and the Written Opinion of the International Searching Authority, or the Declaration with Mail Date Dec. 28, 2022 re: Int'l Appln. No. PCT/US2022/039704. 17 pages.
Wongyu Shin et al. "Bank-Group Level Parallelism" IEEE Transactions On Computers, vol. 66, No. 8, Aug. 2017. 7 pages.
EP Extended European Search Report with Mail Date May 26, 2025 re: EP Appln. No. 22856472.0. 15 pages.

* cited by examiner

| Command Sequence | DDR5 | | RD-WR DRAM | | |
| --- | --- | --- | --- | --- | --- |
| | Different BG | Same BG | Different BG | Same BG | |
| | | | | RD/WR Mux at Bank | RD/WR Mux at Bank |
| RD-RD | $t_{ccd\_s}$ (8) | $t_{ccd\_L}$ (16) | $t_{ccd\_s}$ (8) | $t_{ccd\_L}$ (16) | $t_{ccd\_L}$ (16) |
| WR-WR | $t_{ccd\_s}$ (8) | $t_{ccd\_L}$ (16) | $t_{ccd\_s}$ (8) | $t_{ccd\_L}$ (16) | $t_{ccd\_L}$ (16) |
| RTW (RD-WR) 802 | CL-CWL+RBL/2+$2t_{CK}$ -(Read DQS offset) +($t_{RPST}$ -$0.5t_{ck}$)+$t_{WPRE}$ (11) 804 | CL-CWL+RBL/2+$2t_{CK}$ -(Read DQS offset) +($t_{RPST}$ -$0.5t_{ck}$)+$t_{WPRE}$ (11) | $2^*t_k$ (2) 806 | $t_{CCD\_L}$-CWL-WBL/2 (minimum=$2^*t_{ck}$) (4) 808 | $2^*t_k$ (2) |
| WTR (WR-RD) 810 | CWL+WBL/2+$t_{WTR\_s}$ (60) 812 | CWL+WBL/2+$t_{WTR\_L}$ (60) 814 | $2^*t_k$ (2) 816 | $t_{CCD\_L}$-CWL+WBL/2 (minimum=$2^*t_{ck}$) (28) 818 | $2^*t_k$ (2) 820 |

LOW LATENCY DYNAMIC RANDOM ACCESS MEMORY (DRAM) ARCHITECTURE WITH DEDICATED READ-WRITE DATA PATHS

CROSS REFERENCES TO RELATED APPLICATIONS

This application is a national stage application of international application number PCT/US2022/39704, filed Aug. 8, 2022, which claims the benefit of U.S. Provisional Application No. 63/231,637, filed Aug. 10, 2021, all of which are incorporated by reference herein in their entirety.

TECHNICAL FIELD

The disclosure herein relates to memory systems, memory controllers, memory devices, and associated methods.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 6 illustrates relative timings for various memory operations performed by the memory device architecture of FIG. 5 while in operation.

FIG. 8 illustrates a table that compares various command sequence timings associated with a standardized DDR5-like memory device architecture to command sequence timings associated with disclosed embodiments of the DRAM architectures of FIGS. 2-7.

DETAILED DESCRIPTION

Memory devices, modules, controllers, systems and associated methods are disclosed. In one embodiment, a dynamic random access memory (DRAM) device is disclosed. The DRAM device includes memory core circuitry including an array of DRAM storage cells organized into bank groups. Each bank group includes multiple banks, where each of the multiple banks includes DRAM storage cells coupled to addressable columns of DRAM storage cells. The DRAM device includes signal interface circuitry having dedicated write data path circuitry and dedicated read data path circuitry. Selector circuitry, for a first memory transaction, selectively couples at least one of the addressable columns of DRAM storage cells to the dedicated read data path circuitry or the dedicated write data path circuitry. Some embodiments described herein may employ the selector circuitry in the signaling interface circuitry such that the selecting is carried out at a bank group level. Other embodiments may implement the selector circuitry in the memory core itself to carry out selecting at the bank level. In some embodiments, pin interface circuitry may include one or more hybrid data/command pin that receives write data interleaved with command information. For other embodiments, the pin interface circuitry may include write data pins separate from a command/address pins. By employing dedicated read and write data paths within the DRAM device, memory access operations in the memory core circuitry may be performed independent of any external bus turnaround time, thereby significantly reducing latency between operations, and enabling the ability to conduct multiple memory access operations in the memory core concurrently.

Figure 1:
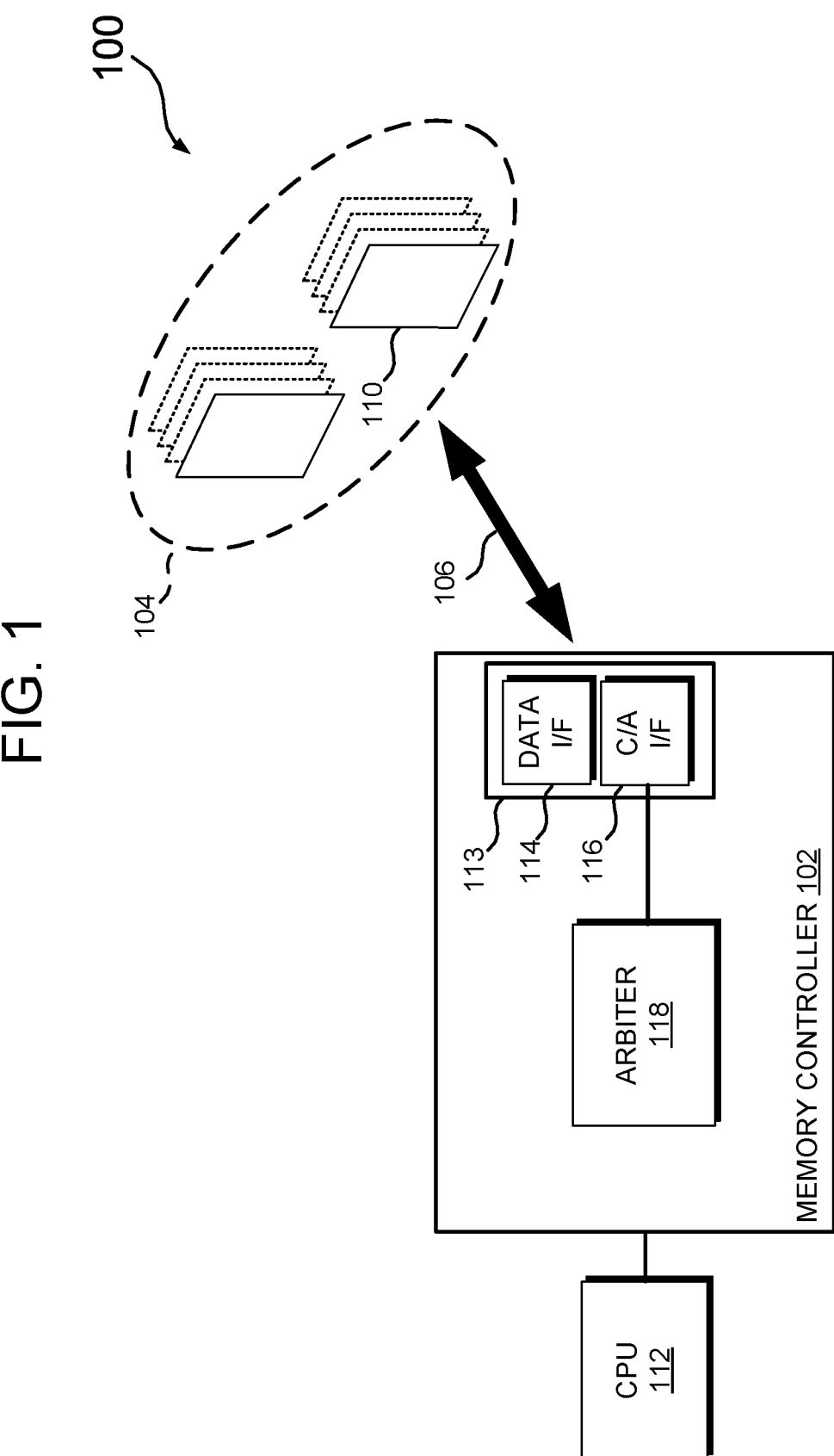
FIG. 1 illustrates one embodiment of a memory system that employs a memory controller, and at least one memory device.

Referring now to FIG. 1, a memory system, generally designated 100, is shown that includes a memory controller 102 coupled to memory 104 via signaling media 106. For one embodiment, the memory controller 102 is a dynamic random access memory (DRAM) controller, with the memory 104 realized as one or more DRAM memory devices 110. In some embodiments, the memory controller 102 and memory devices 110 may be embodied as integrated circuits, or chips. Other embodiments may employ the memory controller as a circuit in a host central processing unit (CPU) 112. Specific embodiments for the DRAM memory controller 102 and memory 104 may be compliant with various DRAM standards, including double data rate (DDR) variants, low power (LPDDR) versions, high bandwidth (HBM), and graphics (GDDR) types. Other embodiments may include multi-chip modules that, for example, employ stacked memory die, or stacked packages. Such embodiments may be used with the memory devices 110. Additional embodiments may stack memory die and logic die together in a common package, or in separate packages stacked upon each other. Yet other embodiments may employ multiple memory devices on a substrate (not shown) in a memory module configuration for high-capacity applications.

Further referring to FIG. 1, for one embodiment, the memory controller 102 includes a memory interface 113 with data interface circuitry 114 and command/address (C/A) interface circuitry 116. One embodiment of the memory controller 102 includes dedicated write data transmit circuits for coupling to dedicated write data paths of the signaling media 106, and dedicated read data receivers for coupling to dedicated read data paths of the signaling media 106. Additional interfaces may also be included to support additional memory channels, each with similar data and C/A interface circuits. A scheduler or arbiter 118 generates command, control, and address signals for controlling memory access operations. For one embodiment, explained below, the arbiter 118 takes advantage of the dedicated write and read data paths to schedule commands for memory access operations with relative timings that are unencumbered by timing constraints associated with external bus turnaround times. As a result, device maximum bandwidth may be improved over standardized memory device architectures on the order of a factor of two for the same input/output (I/O) width and data rate. Further, the scheduling may take advantage of a CAS Write Latency (CWL) parameter associated with the DRAM that is independent of a Read CAS Latency parameter. As a result, read-to-write (RTW) and write-to-read (WTR) turnarounds may be performed faster.

Figure 2:
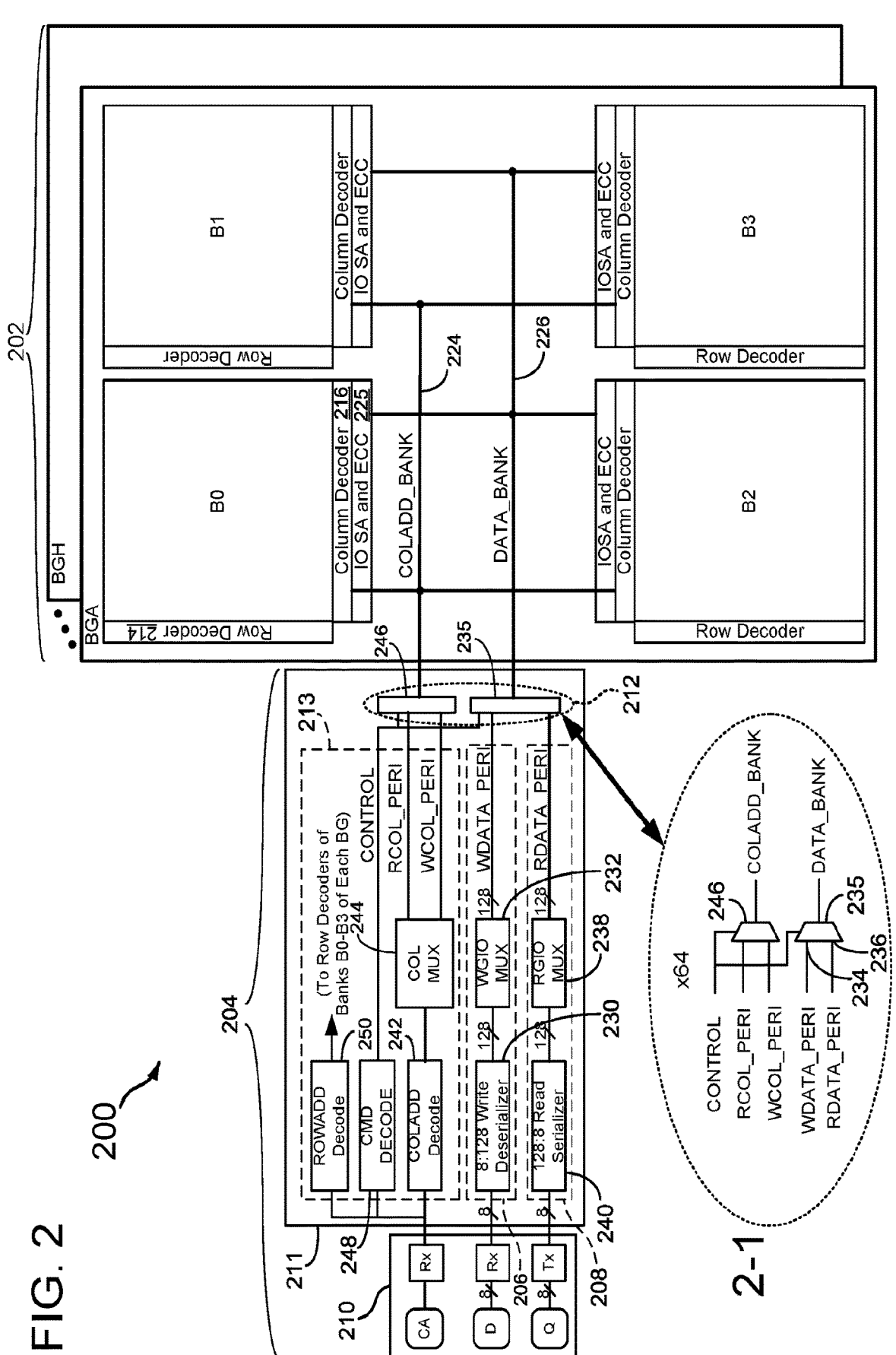
FIG. 2 illustrates one embodiment of a memory device architecture for the memory device shown in FIG. 1.

FIG. 2 illustrates one embodiment of an integrated circuit (IC) dynamic random access memory (DRAM) device architecture, generally designated 200, that substantially preserves traditional DDR5 standardized memory core circuitry 202 while implementing enhancements to signaling interface circuitry 204 of the DRAM device 200 to provide dedicated internal write data paths 206 and dedicated internal read data paths 208. This allows for concurrent accesses to the memory core circuitry 202 that may be performed with turnaround times constrained by bank group activity rather than external bus activity. At a high level, the signaling interface circuitry 204 includes pin interface circuitry 210 and internal signaling interface circuitry 211. The memory core circuitry 202 is organized into bank groups BGA-BGH that couple to the internal signaling interface circuitry 211. A selector circuit 212 disposed in the internal signaling interface circuitry 211 selectively couples the internal dedicated write and read data paths 206 and 208 to the memory core circuitry 202 at a bank group level.

Further referring to FIG. 2, for one embodiment, each bank group in the memory core circuitry 202 is organized into multiple addressable banks (for example, B0-B3). In an embodiment, the banks are further divided in blocks (mats) having local wordlines and bitlines that are at the edge of the mats connected through local wordline decoders/drivers and primary sense-amplifiers respectively to the wordlines and bitlines that are connected to row decoder 214, column decoder 216 and IO SA ECC circuit 225. This further division is omitted in FIG. 2 for the sake of simplicity.

The multiple banks B0-B3 within each bank group BGA-BGH interface with the selector circuitry 212 via a core column address path 224 that feeds the column decoders 216 of each bank, and a core data path 226 that selectively provides write or read data between the selector circuitry 212 and the sense amplifier/ECC circuitry 225. By organizing the banks of the memory core circuitry 202 into bank groups, separate independent operations may be carried out concurrently by a separate bank in each bank group.

With continued reference to FIG. 2, as noted above, the signaling interface circuitry 204 includes the pin interface circuitry 210, the internal signaling interface circuitry 211 and the selector circuitry 212 to allow for separate memory accesses to the memory core circuitry 202 in different bank groups concurrently. With this in mind, the pin interface circuitry 210 provides physical connection circuitry for communicating with the memory controller 102 (FIG. 1) (or buffer, in the case of buffered module applications) in the form of multiple "data-in" pins "D" and multiple "data-out" pins "Q." For the embodiment of FIG. 2, one or more dedicated command and address pins, identified as "CA" also forms a portion of the pin interface circuitry 210. While the pin interface circuitry 210 of FIG. 2 shows eight "data-in" pins "D" and eight "data-out" pins "Q", representing a by-8 (×8) width device, other widths may be employed with corresponding changes to the number of D and Q pin circuits.

Further referring to FIG. 2, the "data-in" pins "D" include respective contacts that connect to corresponding dedicated write data signaling paths of the signaling media 106 (FIG. 1). Multiple receiver circuits Rx couple to the multiple "data-in" pins D to receive write data transmitted unidirectionally by the memory controller 102 along the write data signaling paths.

In a manner similar to the "data-in" pins "D", the "data out" pins "Q" include respective contacts that couple to corresponding read data signaling paths of the signaling media 106. However, instead of employing multiple receivers, the "data-out" pins "Q" include multiple transmitters Tx to transmit read data unidirectionally along the read data signaling paths to the memory controller 102. Again, although the embodiment of FIG. 2 illustrates eight "data-out" pins and transmitters, any number of pins and transmitters may be employed consistent with the data transfer protocol that is implemented.

The command/address pins CA also include respective contacts to interface with a corresponding number of command/address/control signal paths of the signaling media 106 that unidirectionally provide the DRAM with command, address, and control signals to effect memory access operations. One or more CA receiver circuits couple to the one or more CA pins "CA" to receive the command, address, and control signals. While not shown, further CA pins may be provided in the pin interface circuitry 210, such as clock signal pins, strobe signal pins, chip select pins and so forth.

Further referring to FIG. 2, in order to selectively connect a given bank group of the memory core circuitry 202 to the pin interface circuitry 210, the internal signaling interface 211 employs the dedicated read data path circuitry 208, the dedicated write data path circuitry 206, and dedicated command/address path circuitry 213 to interconnect the pin interface 210 with the selector circuitry 212. The dedicated write data path circuitry 206 includes a first segment of multiple receiver output paths from the write data receivers Rx to feed an input of a write deserializer 230. For one embodiment, the write deserializer 230 transforms N (such as eight, for one example) serialized inputs at a first data rate into M (such as one-hundred-twenty-eight) deserialized outputs as a second data rate slower than the first data rate by a factor of N/M. The deserialized outputs are then fed to a write global input/output WGIO multiplexer 232. The resulting outputs of the WGIO multiplexer 232 are then directed along a first set of peripheral selection paths WDATA_PERI to a first set of ports, at 234 (shown in magnified view 2-1), of the selector circuitry 212.

The dedicated read data path circuitry 208 routes read data in a direction opposite to that of the dedicated write data path circuitry 206 and includes a second set of selection paths RDATA_PERI that are coupled to a second set of ports 236 of the selection circuitry 212. The second set of selection paths feed an input of a read global input/output (RGIO) multiplexer 238. The output of the RGIO multiplexer 238 then feeds a read serializer 240 to serialize the read data from a relatively wide set of M input data paths (for example, one-hundred twenty-eight) at a first data rate, to a reduced set of N data paths (such as eight) at a second data rate that is higher than the first data rate by a factor of M/N.

Further referring to FIG. 2, the CA path circuitry 213 generally runs unidirectionally, which allows for the CA signals to be routed temporally (such as being time-multiplexed or interleaved along fewer signaling paths at a higher signaling rate) or spatially (such as being physically routed along multiple paths at a slower signaling rate). For one embodiment, received CA signals are fed to a column address decoder 242 which extracts column address information for a given memory access operation. The column address information is then fed to an input of a column multiplexer 244 which includes multiple outputs for read column information routed along the dedicated read column path RCOL_PERI and write column information along the dedicated write column path WCOL_PERI. The read column information and the write column information are then fed as inputs to the selector circuitry 212. The CA path circuitry 213 also includes a command decoder 248 that runs in parallel with the column address decoder circuitry 242. The command decoder 248 determines the type of operation to be carried out with the received column information and generates a control signal "CONTROL" that is fed to the selector circuitry 212. A row address decoder 250 is also provided by the CA path circuitry 213 to extract the row address information for the given memory access operation, where it is fed to memory core row decoder circuits 214.

For the embodiment of FIG. 2, the selector circuitry 212 is disposed in the internal signaling interface 211 and selectively connects the dedicated write data path circuitry 206 or the dedicated read data path circuitry 208 to the memory core circuitry 202 on a bank group basis. For one embodiment, shown in magnified view 2-1, the selector circuitry 212 employs a first multiplexer 246 to select between read column information and write column information to pass as an output column address signal COLADD_BANK to the column decoder circuits of a selected bank group as controlled by the command decode control signal CONTROL. A second multiplexer 235 couples the selected bank group data paths for the multiple banks to either the dedicated read data path 208 or the dedicated write data path 206 depending on the control signal CONTROL.

In operation, the DRAM device architecture of FIG. 2 allows for memory access operations with relative timings that are unencumbered by timing constraints associated with external bus turnaround times. As a result, device bandwidth may be significantly improved for a same input/output (I/O) width and data rate associated with a traditional DDR5-like device. Further, a CAS Write Latency (CWL) parameter associated with the DRAM is no longer a function of a Read CAS Latency parameter. Additionally, read-to-write (RTW) and write-to-read (WTR) turnarounds may be performed faster.

Figure 3:
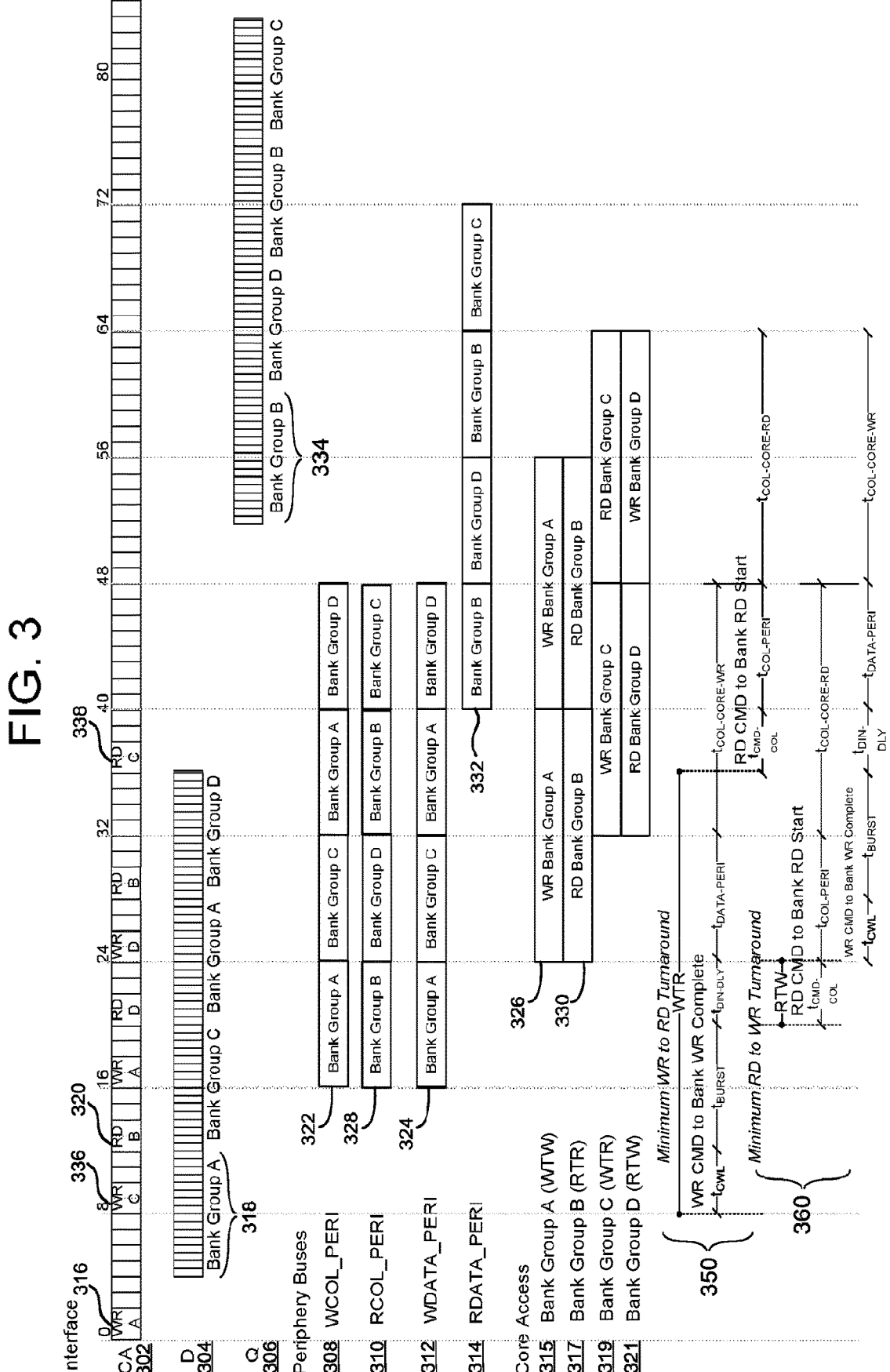
FIG. 3 illustrates relative timings for various memory operations performed by the memory device architecture of FIG. 2 while in operation.

FIG. 3 illustrates relative timing parameters for a series of memory access operations carried out for multiple bank groups in the DRAM device architecture of FIG. 2. The top three lines of the timing diagram, at 302, 304 and 306, represent timings of signals seen at the pin interface circuitry, including command signals at the CA pin (referenced to a system clock signal shown in a series of eight clock cycle segments), write data at the "data-in" "D" pin, and read data at the "data-out" "Q" pin. The next four lines, at 308, 310, 312, and 314, represent respective write/read column address information and data as seen at the respective periphery busses. The last four lines, at 315, 317, 319, and 321, represent core access intervals seen at the memory core for bank groups A, B, C, and D, respectively. Timing components of common DRAM timing parameters, such as the minimum write-to-read turnaround time WTR (within the same bank group) and the minimum read-to-write turnaround time RTW (within the same bank group) are shown at the very bottom of FIG. 3.

Further referring to FIG. 3, for a first example, a concurrent access to memory bank groups A and B will be described with the understanding that "concurrent accesses" to the memory core involve at least first and second memory access intervals to access storage cells such that the first and second memory access intervals at least partially overlap in time. For example, at 316, a first write command is received on the CA pin for a write operation to bank group BGA. At 318, the corresponding write data for writing to bank group BGA is received at the data-in pins "D". At 320, a read command is received to read data from bank group BGB. To activate an access to bank group BGA for the write operation, the selector circuitry (not shown) passes write column information, at 322, from the dedicated CA path along with write data from the dedicated write data path to bank group BGA, at 324. Following a delay based on the peripheral write paths, an access to an addressed column of an addressed bank in bank group BGA is available during a first core access interval, at 326. Similarly, to activate an access to bank group BGB for the read operation, the selector circuitry (not shown) passes read column information from the dedicated CA path to bank group BGB, at 328. Following a delay based on the peripheral read paths, an access to an addressed column of an addressed bank in bank group BGB is available during a second core access interval, at 330. The first interval at 326 and the second interval at 330 substantially overlap in time, constituting concurrent core accesses to bank groups BGA and BGB. Note that while the core accesses for bank groups BGA and BGB occur concurrently, the routing of the accessed read data from bank group BGB along the read peripheral paths occurs at 332, and the read data transmitted from the DRAM pin interface, at 334.

Employing dedicated read and write data paths internal to the DRAM allows for significantly reduced latencies in accessing bank groups, especially for accesses that involve mixed back to back read and write operations. For example, as shown at the bottom of FIG. 3, at 350, an exemplary minimum write-to-read turnaround time is shown that is initiated by a write command to bank group BGC, at 336, subsequently followed by a read command to bank group BGC, at 338. The write-to-read turnaround time generally involves a programmable CAS write latency component $t_{CWL}$, a burst component $t_{BURST}$ that represents the time interval associated with a burst of write data, components representing internal routing delays $t_{DIN-DLY}$ and $t_{DATA-PERI}$, and a portion of a column core write time $t_{COL-CORE-WR}$. Since the internal write data paths within the DRAM architecture of FIG. 2 are unidirectional, and thus dedicated to transferring only write data, the CAS write latency component of the minimum write-to-read turnaround time is independent of a conventional CAS latency parameter, which generally takes into account external delays attributable to external bidirectional bus turnaround times. As a result, the write-to-read turnaround time for the DRAM architecture of FIG. 2 is constrained mainly by internal bank group activities that have little-to-no appreciable latencies. Similar benefits are realized for a minimum read-to-write turnaround time RTW, shown at 360.

Figure 4:
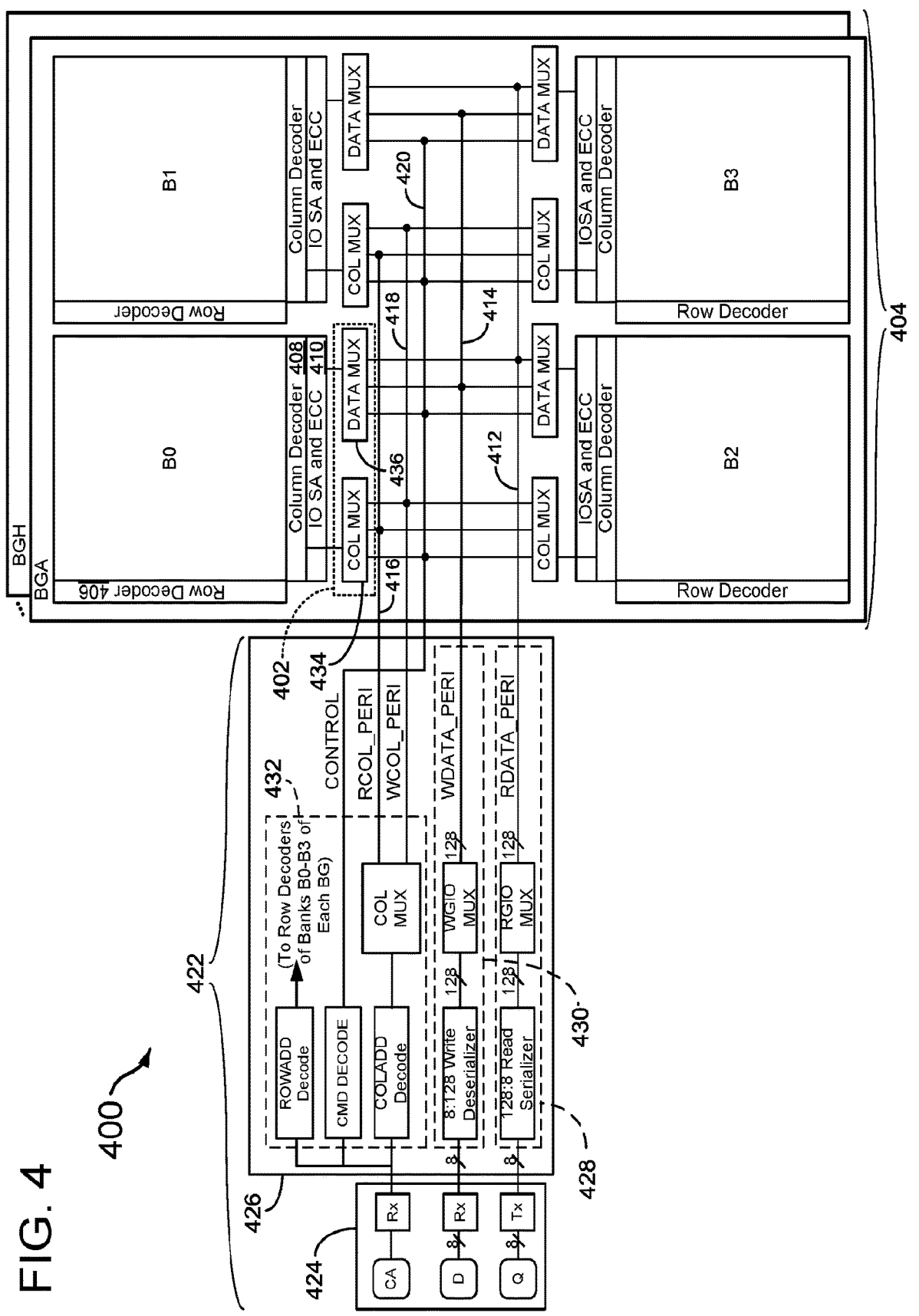
FIG. 4 illustrates a further embodiment of a memory device architecture that is similar to the architecture of FIG. 2.

FIG. 4 illustrates a further embodiment of a DRAM device architecture, generally designated 400, that is similar to the DRAM device architecture of FIG. 2. While the selector circuitry 212 of FIG. 2 was disposed in the internal signaling interface circuitry 211 (FIG. 2) to select between activating read and write signaling paths at the bank group level, the architecture of FIG. 4 incorporates per-bank selection circuitry 402 that is distributed within enhanced memory core circuitry 404 in a manner that allows for selectively activating read and write signaling paths on a per-bank basis to achieve concurrent memory accesses to different banks within a same or different bank group within the memory core circuitry 404.

With continued reference to FIG. 4, the enhanced memory core circuitry 404 employs multiple banks B0-B3 of storage cells, with the banks organized into bank groups BGA-BGH. Each bank, such as bank B0, includes a row decoder 406, column decoder 408, and sense amplifier/ECC circuitry 410, similar to the architecture of FIG. 2. Unlike the architecture of FIG. 2, the memory core circuitry 404 in the embodiment of FIG. 4 incorporates internally-routed dedicated read and write data paths 412 and 414. Respective read and write column address paths 416 and 418 are also formed in the memory core circuitry 404, as is a control signal path 420.

The DRAM device architecture of FIG. 4 further includes interface circuitry 422 that is similar to the prior-disclosed DRAM device embodiment of FIG. 2, with pin interface circuitry 424 including dedicated read and write pins "Q" and "D", and a CA pin "CA." Internal signaling interface circuitry 426 is also similar to the embodiment of FIG. 2, including dedicated interface read and write paths 428 and 430, and a column address path 432. However, unlike the prior embodiment of FIG. 2, the dedicated signaling paths 428, 430 and 432 traverse the entire internal signaling interface circuitry 426 without being selectively switched by any bank group interface selector circuitry.

As noted above, and further referring to FIG. 4, to selectively activate read and write signaling paths on a per-bank basis to achieve concurrent memory accesses to different banks, the memory core circuitry 404 incorporates the selector circuitry 402 at each bank in the form of a column multiplexer 434 and a data multiplexer 436. Each column multiplexer 434 receives read and write column information RCOL_PERI and WCOL_PERI as inputs from the dedicated read and write column signaling paths 416 and 418, and a control input from the control signal path 420. Each data multiplexer 436 receives the read and write data as input/output data associated with the dedicated read and write data paths 412 and 414, and a control input from the control signal path 420.

In operation, the various timings associated with performing read and write operations are similar to the timings shown in FIG. 3. However, since the dedicated read and write data paths 412 and 414 (and column address paths 416 and 418) extend into the memory core circuitry 404, latencies associated with back-to-back memory access operations may be further reduced since the resulting bidirectional path lengths to access the memory core storage cells are than much shorter, resulting in shorter propagation times and associated delays.

Figure 5:
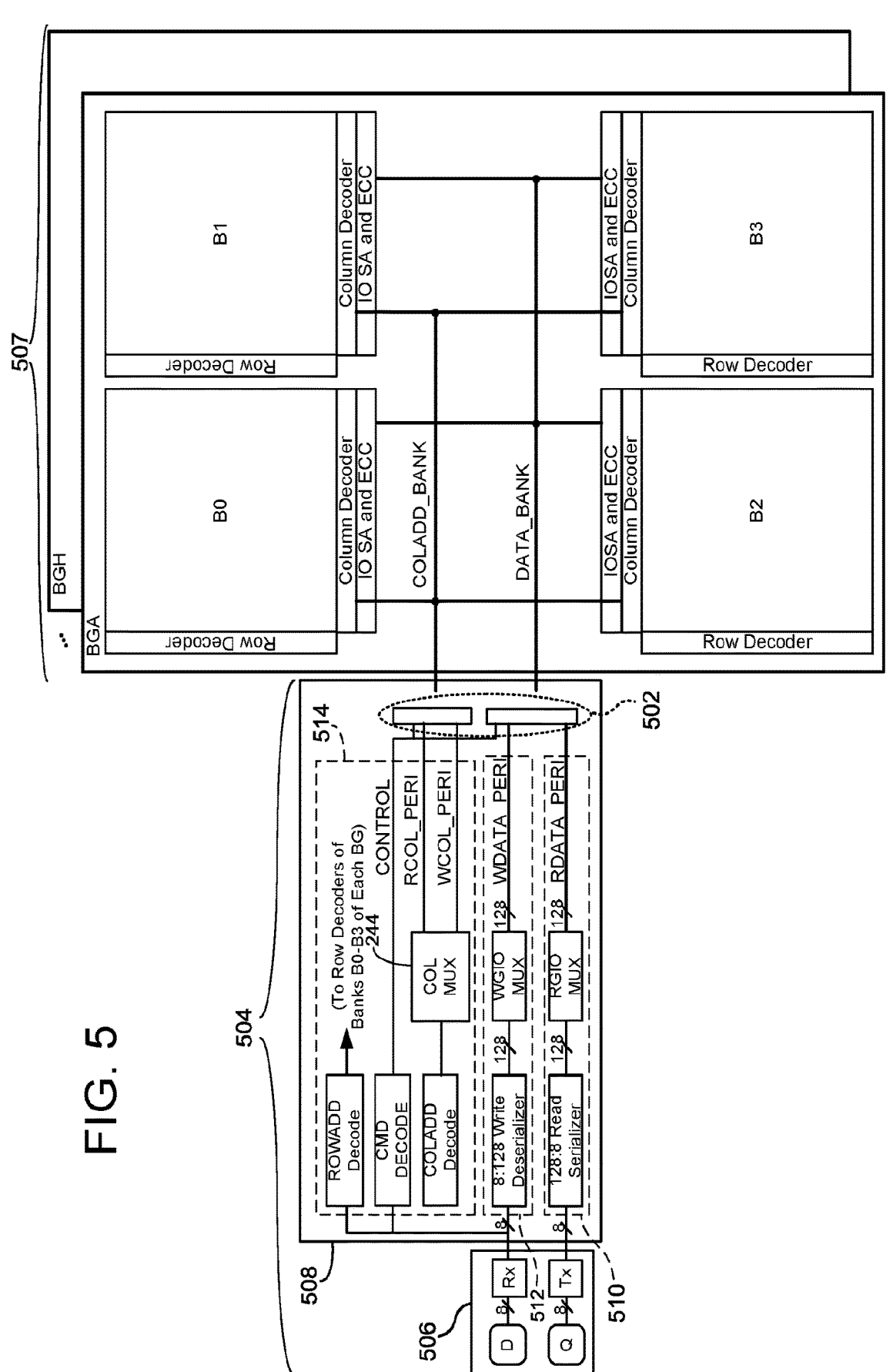
FIG. 5 illustrates another embodiment of a memory device architecture for use in the memory system of FIG. 1.

FIG. 5 illustrates a further embodiment of a DRAM device architecture that is similar to the embodiment of FIG. 2, with selector circuitry 502 disposed in interface circuitry 504, but incorporating modified pin interface circuitry 506 that supports a DQ-DDR protocol for memory access operations involving memory core circuitry 507. A DQ-DDR protocol generally involves interleaving command and address information with write data for transmission along the "data-in" path D. To support the DQ-DDR protocol, the pin interface circuitry 506 omits dedicated CA pins, utilizing the "data-in" pins "D" to receive the interleaved write command information and write data, thereby reducing the DRAM device pin count. The interface circuitry 504 employs an enhanced internal signaling interface 508 that includes dedicated read and write data paths 510 and 512, and a dedicated column address path 514 that extracts the column address information from the "data-in" path D. The remaining architecture is very similar to that of the embodiment shown in FIG. 2 and described above.

Figure 6:
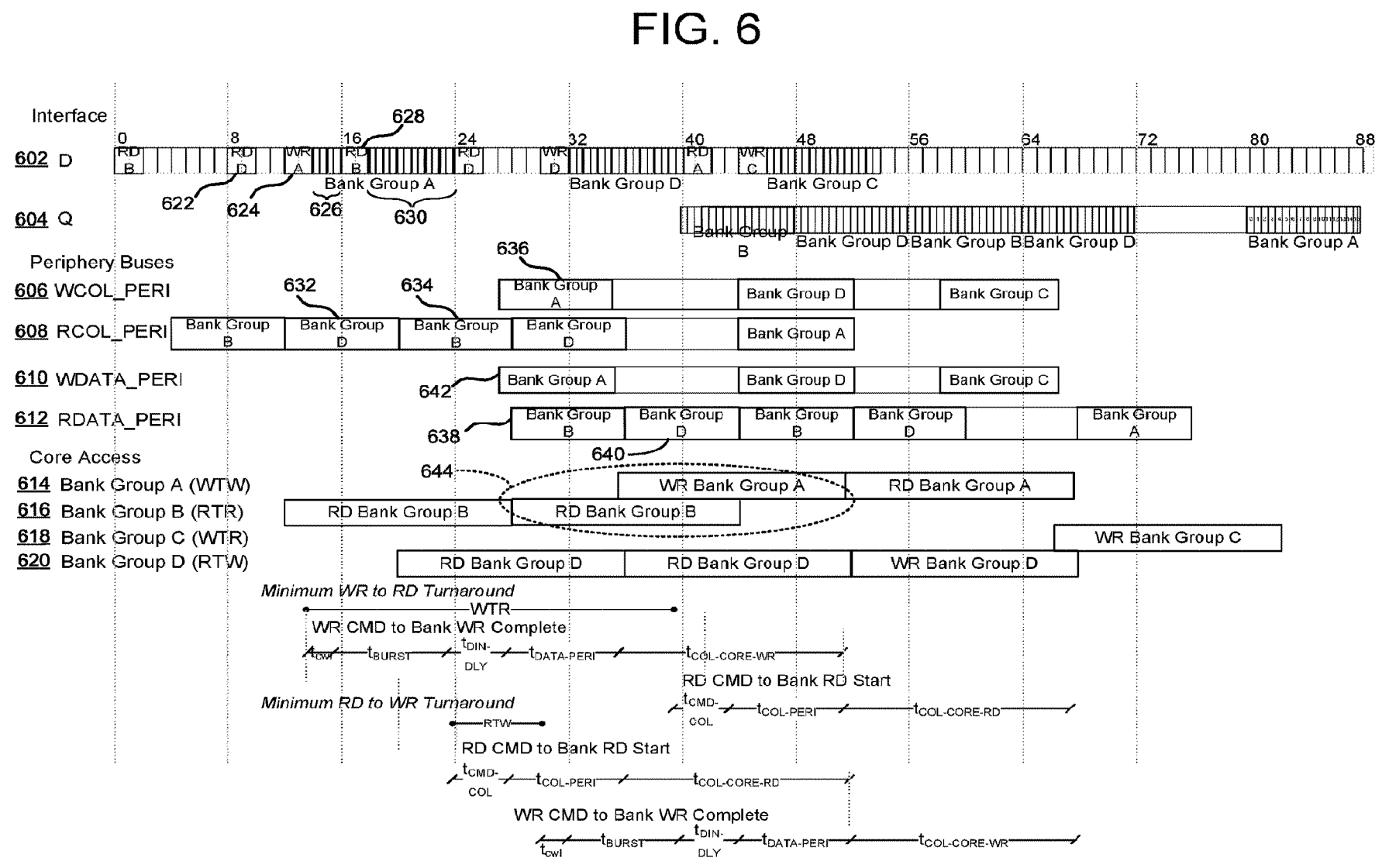

FIG. 6 illustrates relative timing parameters for a series of memory access operations carried out for multiple bank groups in the DRAM device architecture of FIG. 5. The top two lines of the timing diagram, at 602 and 604, represent timings of signals seen at the pin interface circuitry, including command and write data signals at the "data-in" "D" pins (referenced to a system clock signal shown in a series of eight clock cycle segments), and read data at the "data-out" "Q" pins. The next four lines, at 606, 608, 610, and 612, represent respective write/read column address information and data as seen at the respective periphery busses. The last four lines, at 614, 616, 618, and 620, represent core access intervals seen at the memory core for bank groups A, B, C, and D, respectively. Timing components of common DRAM timing parameters, such as the minimum write-to-read turn-around time WTR (within the same bank group) and the minimum read-to-write turnaround time RTW (within the same bank group) are shown at the very bottom of FIG. 6, and are similar to the timing components shown in FIG. 3.

Further referring to FIG. 6, in operation, concurrent accesses to the memory core circuitry 507 may take place through appropriate scheduling of multiple timing commands. For example, a first sequence of read and write operations for concurrent accesses to the memory core circuitry 507 may include a first read operation to bank group BGD, at 622, followed by a write command for bank group BGA, at 624. Accompanying the write command along the "data-in" "D" bus are the first four bits of a sixteen-bit burst of write data, at 626. Interleaved with the burst of write data is a scheduled read command to bank group BGB, at 628, followed by the remaining twelve bits of the write data burst, at 630.

With continued reference to FIGS. 6, at 632 and 634, the corresponding read column information corresponding to the read commands to Bank Groups D and B are transferred along the peripheral read column address paths of the interface. In a similar manner, the write column address data path is activated at 636 for bank group BGA. At the memory core, the sense amplifier circuitry for bank groups BGB and BGD are activated, at 638 and 640, corresponding to the two read commands, while the write data paths for a direct write operation to the core is activated for bank group BGA, at 642. As indicated by the dashed semicircle, at 644, the time intervals corresponding to the accesses to bank groups BGA and BGB at least partially overlap in time, thus constituting concurrent memory core accesses.

Figure 7:
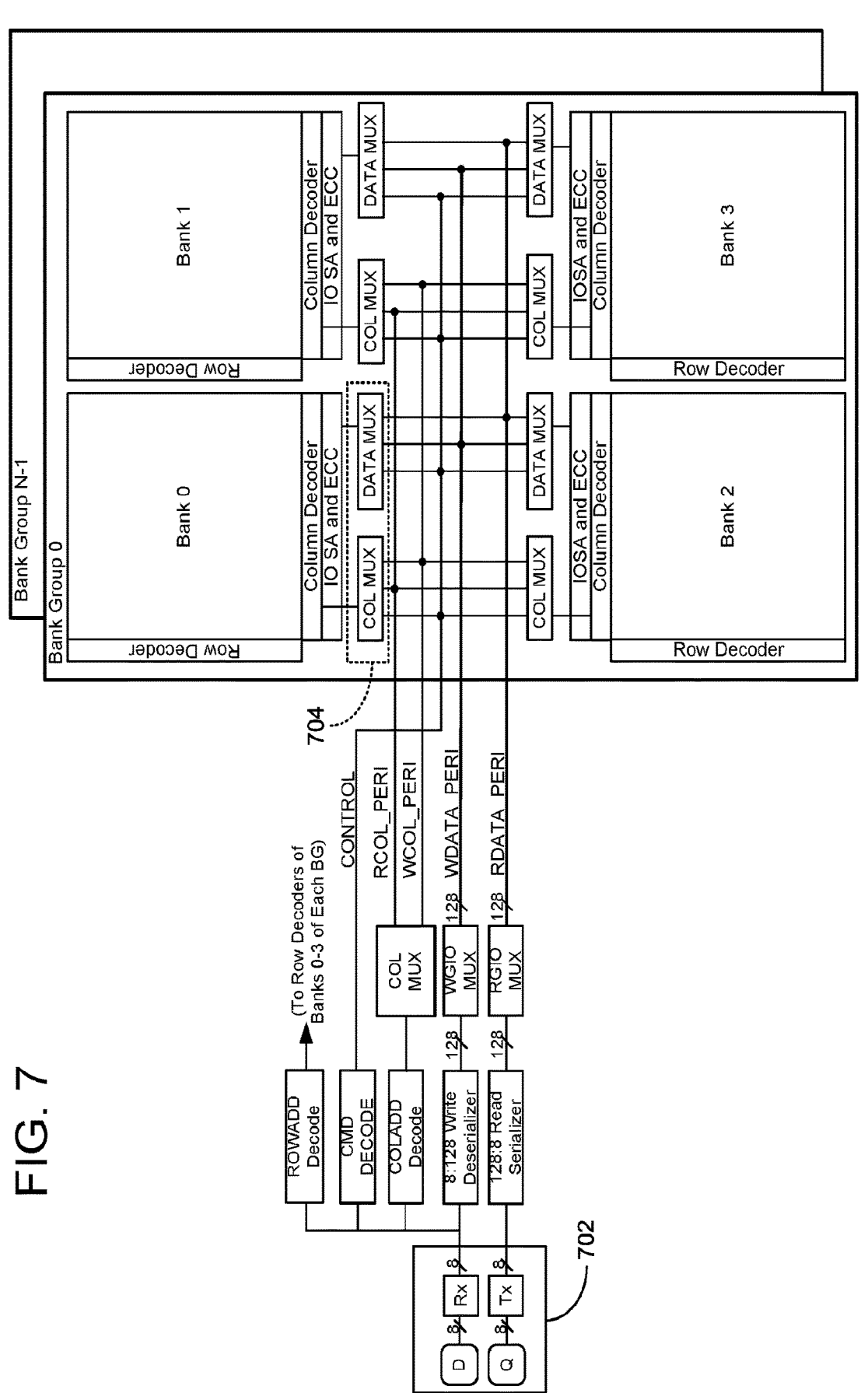
FIG. 7 illustrates a further embodiment of a memory device architecture that is similar to the architecture of FIG. 5.

FIG. 7 illustrates a further embodiment of a DRAM device architecture similar to FIG. 5, incorporating pin interface circuitry 702 that supports the DQ-DDR protocol, but also employing selector circuitry 704 in the memory core, similar to the embodiment of FIG. 4.

As noted above, by employing dedicated read and write paths internal to the DRAM, significant improvements in latency may be realized. This is generally due to corresponding reductions in turnaround times associated with bidirectional signaling paths, since the lengths of any remaining bidirectional paths are minimal. To illustrate the latency benefits associated with the DRAM architectures described herein, FIG. 8 illustrates a table that compares typical read and write command timings between a standardized DDR5-6400 (×8) DRAM architecture, and several of the DRAM architecture embodiments described above (referred to as "RD-WR DRAM"). For a given command sequence of multiple commands, such as a read-to-read, or read-to-write, a latency timing parameter is identified for each architecture that corresponds to the command sequence being directed to the same bank group, and also directed to different bank groups. The numbers in parentheses beneath each timing parameter represents a number of clock cycles of latency associated with the timing parameter.

Further referring to FIG. 8, the first two rows of timing parameters involve a timing interval, denoted as $t_{CCD}$, that represents a number of clock cycles that must be allowed to elapse between successive column commands. For successive commands directed to different bank groups, the interval is denoted as "short", and identified as $t_{CCD-S}$. The interval is denoted by "long" for column-to-column commands directed to the same bank group, and identified as $t_{CCD-L}$. As can be seen from the table of FIG. 8, the successive column-to-column timings $t_{CCD\text{-}S}$ and $t_{CCD\text{-}L}$ associated with read-to-read and write-to-write command sequences for both the DDR5 DRAM device architecture, and the RD-WR DRAM device architectures are the same, with the $t_{CCD\text{-}S}$ timing interval involving eight cycles, and the $t_{CCD\text{-}L}$ interval involving sixteen clock cycles. The similarities in the column-to-column timing parameters are generally due to the repetitive command types (read-to-read and write-to-write), which do not involve any turnaround time to minimize signaling conflicts on a bidirectional bus.

With continued reference to FIG. 8, for command sequences that involve different command types, such as a read-to-write or write-to-read, bus turnaround times to allow an external (and internal) bidirectional data bus to transition between a transfer of read data to write data (or vise-versa) may involve significant time intervals. For standardized DDR5 devices, in the case of a read-to-write command sequence, at 802, a bus turnaround timing interval for operations directed to the same bank group or different bank groups may be expressed, at 804, as:

$$CL - CWL + RBL/2 + 2tCK -$$
$$(\text{Read } DQS \text{ offset}) + (tRPST - 0.5tCK) + tWPRE$$

where:

CL represents a CAS Latency interval that represents a number of clock cycles for a DRAM device to access a specific set of data in one of its columns and make that data available on its output pins;

CWL represents a programmable delay in clock cycles between an internal write command and the availability of the first bit of input write data (for one embodiment, the CWL for the RD-WR DRAM architecture may be four, while a typical setting for DDR5 may be CL-2 clock cycles);

RBL represents a read data burst length;

$t_{CK}$ represents a clock cycle time;

Read DQS offset represents an offset interval between read data and a corresponding read data strbe;

$t_{RPST}$ represents a read data strobe postamble timing interval; and $t_{WPRE}$ represents a write data strobe preamble timing interval.

For the standardized DDR5 DRAM device architecture (such as DDR5-6400 ×8), the bus turnaround time interval for a read-to-write command sequence generally involves eleven clock cycles. In other words, eleven clock cycles need to elapse between the end of a read operation and the start of an immediately following write operation in order for the bidirectional bus to be ready for the transfer of write data. However, as shown in FIG. 8, for the RD-WR DRAM device architecture, such a command sequence directed to different bank groups merely involves a two clock cycle interval, at 806. When directed to the same bank group, the worst-case latency, shown at 808, may be expressed as:

$$t_{CCD\_L} - CWL - WBL/2$$

where:

WBL represents a write burst length timing component. The expression above generally involves internal timing parameters, and for a worst-case scenario, only involves four clock cycles of latency. Both the best-case and worst-case latency scenarios realized by the RD-WR DRAM architecture are significantly shorter than the standardized DDR5 DRAM architecture.

Further referring to FIG. 8, for the standardized DDR5 device architecture (DDR5-6400 ×8), in the case of a write-to-read command sequence, at 810, a bus turnaround timing interval for operations directed to different bank groups may be expressed, at 812, as:

$$CWL + WBL/2 + t_{WTR\_S}$$

where:

$t_{WTR\_S}$ represents a minimum time interval ("short") to allow the external data bus to settle following the transfer of write data before transferring read data to a different bank group. For write-to-read command sequences directed to the same bank group, the bus turnaround time interval, at 814, may be expressed as:

$$CWL + WBL/2 + t_{WTR\_L}$$

where:

$t_{WIR\_L}$ represents a minimum time interval ("long") to allow the external data bus to settle following the transfer of write data before transferring read data to the same bank group. As shown in FIG. 8, for the RD-WR DRAM device architecture, the write-to-read command sequence directed to different bank groups merely involves a two clock cycle interval, at 816. When directed to the same bank group however, the worst-case latency may be expressed, at 818, as:

$$t_{CCD\_L} + CWL + WBL/2$$

Since the operations are directed to the same bank group, the latency interval is primarily based on the time needed for the write operation to finish in the memory core. The interval may be optimized through an appropriate setting to the CWL parameter. Note that for both the read-to-write and write-to-read command sequences, the RD-WR DRAM architecture that employs selector circuitry in the memory core, at the bank level, realizes minimum latency intervals of two clock cycles, as shown at 820.

Those skilled in the art will appreciate the low-latency DRAM architecture described above. By employing dedicated unidirectional read and write data paths internal to the DRAM memory device, latencies associated with external bus turnaround times may be significantly reduced. Since memory access operations involving the low-latency DRAM are unencumbered by timing constraints associated with external bus turnaround times, device bandwidth may be improved over standardized architectures by a factor of two for the same input/output (I/O) width and data rate. Further, scheduling of the memory access operations may take advantage of a CAS Write Latency (CWL) parameter associated with the DRAM that is independent of a CAS Latency parameter.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A dynamic random access memory (DRAM) device, comprising:
   memory core circuitry comprising an array of DRAM storage cells organized into bank groups, each bank group comprising multiple banks, each of the multiple banks comprising addressable columns of DRAM storage cells;
   signal interface circuitry comprising
      unidirectional write data path circuitry;
      unidirectional read data path circuitry;
   selector circuitry, for a first memory transaction, to selectively couple at least one of the addressable columns of DRAM storage cells to the unidirectional read data path circuitry or the unidirectional write data path circuitry; and
   pin interface circuitry to interface the DRAM device to a memory controller the pin interface circuitry comprising
      dedicated write data receivers coupled to the unidirectional write data path circuitry; and
      dedicated read data transmitters coupled to the unidirectional read data path circuitry.

2. The DRAM device of claim 1, wherein:
   the pin interface circuitry comprises command/address receiver circuitry to receive command and address information from a command/address bus; and
   wherein the signal interface circuitry comprises command/address path circuitry coupled to the command/address receiver circuitry.

3. The DRAM device of claim 2, wherein the command/address path circuitry comprises:
   a dedicated write column address path;
   a dedicated read column address path; and
   wherein the command/address receiver circuitry is configured to receive consecutive read-to-write or write-to-read commands to different bank groups.

4. The DRAM device of claim 1, wherein:
   the selector circuitry comprises a multiplexer circuit disposed in the signal interface circuitry to perform selection operations for ones of the addressable columns of DRAM storage cells at a bank group level, wherein the selector circuitry is responsive to respective control signals to:
      select the unidirectional write data path circuitry to pass write data to a first bank group during a first memory access interval in response to a write command; and
      select the unidirectional read data path circuitry to receive read data accessed from a second bank group during a second memory access interval in response to a read command immediately subsequent to the write command; and
      wherein the second memory access interval at least partially overlaps the first memory access interval.

5. The DRAM device of claim 1, wherein:

the memory core circuitry comprises unidirectional core write data paths coupled to the unidirectional write data paths;

unidirectional core read data paths coupled to the unidirectional read data paths; and the selector circuitry comprises a multiplexer circuit disposed in the memory core circuitry to perform selection operations for ones of the addressable columns of DRAM storage cells at a bank level, the selector circuitry being responsive to control signals during a first memory access interval, to select the unidirectional core write data path circuitry to pass write data to a first bank of a first bank group in response to a write command; and during a second memory access interval, to select the unidirectional core read data path circuitry to receive read data accessed from a second bank of the first bank group in response to a read command immediately subsequent to the write command; and wherein the second memory access interval at least partially overlaps the first memory access interval.

6. The DRAM device of claim 1, further comprising:

register storage to store a column address strobe (CAS) latency value that is independent of a write-to-read turnaround time.

7. A method of operation in an integrated circuit (IC) dynamic random access memory (DRAM) device, the IC DRAM device comprising memory core circuitry organized into at least a first bank group of storage cells and a second bank group of storage cells, the method comprising:

interfacing the IC DRAM device to a memory controller via pin interface circuitry, the pin interface circuitry comprising dedicated write data receivers coupled to unidirectional write data path circuitry and dedicated read data transmitters coupled to unidirectional read data path circuitry:

receiving command/address (C/A) information from a memory controller, the C/A information defining a first memory access command to perform a first memory access operation to memory core circuitry comprising a first bank of the first bank group of storage cells;

selecting between the unidirectional write data path or the unidirectional read data path based on whether the first memory access command specifies a read operation or a write operation; and transferring data associated with the first memory access command along the selected unidirectional write data path or the unidirectional read data path.

8. The method of claim 7, wherein:

the selecting is performed by multiplexer circuitry disposed in interface circuitry of the IC DRAM to perform selection operations on a bank group basis.

9. The method of claim 7, wherein:

the selecting is performed by multiplexer circuitry disposed in the memory core circuitry to perform selection operations on a per-bank basis.

10. The method of claim 7, wherein:

the receiving of the C/A information occurs at a dedicated C/A pin.

11. The method of claim 7, wherein:

the receiving of the C/A information occurs at a dedicated write data pin.

12. The method of claim 11, wherein the receiving of the C/A information further comprises:

receiving the C/A information interleaved with write data.

13. An integrated circuit (IC) dynamic random access memory (DRAM) device, comprising:

memory core circuitry comprising a first bank group of storage cells;

memory interface circuitry comprising dedicated write data path circuitry;

dedicated read data path circuitry;

selector circuitry, for a first memory transaction, to selectively couple an addressed set of storage cells of the first bank group of storage cells to the dedicated write data path circuitry or the dedicated read data path circuitry, based on whether the first memory transaction comprises a write operation or a read operation; and pin interface circuitry to interface the DRAM device to a memory controller, the pin interface circuitry comprising dedicated write data receivers coupled to the dedicated write data path circuitry; and dedicated read data transmitters coupled to the dedicated read data path circuitry.

14. The IC DRAM device of claim 13, wherein:

the selector circuitry is disposed in the memory interface circuitry to perform selection operations for the dedicated write data path circuitry and the dedicated read data path circuitry on a bank group basis, wherein the selector circuitry is responsive to respective control signals to:

select the dedicated write data path circuitry to pass write data to a first bank group during a first memory access interval in response to a write command; and select the dedicated read data path circuitry to receive read data accessed from a second bank group during a second memory access interval in response to a read command immediately subsequent to the write command; and wherein the second memory access interval at least partially overlaps the first memory access interval.

15. The IC DRAM device of claim 13, wherein:

the memory core circuitry further comprises:

dedicated core write data paths coupled to the dedicated write data paths;

dedicated core read data paths coupled to the dedicated read data paths;

the selector circuitry is disposed in the memory core circuitry to perform selection operations for the dedicated write data path circuitry and the dedicated read data path circuitry on a per-bank basis, wherein the selector circuitry is responsive to control signals to during a first memory access interval, select the dedicated core write data path circuitry to pass write data to a first bank of a first bank group in response to a write command; and during a second memory access interval, select the dedicated core read data path circuitry to receive read data accessed from a second bank of the first bank group in response to a read command immediately subsequent to the write command; and wherein the second memory access interval at least partially overlaps the first memory access interval.

16. The IC DRAM device of claim 13, wherein:

the pin interface circuitry comprises command/address receiver circuitry to receive command and address information from a command/address bus; and wherein the memory interface circuitry comprises command/address path circuitry coupled to the command/address receiver circuitry.

17. The IC DRAM device of claim 16, wherein the command/address path circuitry comprises:

a dedicated write column address path; and a dedicated read column address path.

18. The IC DRAM device of claim 16, wherein:

the command/address receiver circuitry is configured to receive consecutive read-to-write or write-to-read commands to different bank groups.

\* \* \* \* \*